US012681768B2

(12) United States Patent
Sheng et al.

(10) Patent No.: US 12,681,768 B2
(45) Date of Patent: Jul. 14, 2026

(54) RESOURCE OPTIMIZED LOAD BALANCING OF MICROSERVICE REQUESTS

(71) Applicant: INTERNATIONAL BUSINESS MACHINES CORPORATION, Armonk, NY (US)

(72) Inventors: Hao Sheng, Ningbo (CN); Rong Fu, Ningbo (CN); Pan Li, Beijing (CN); Xiao Lin Sun, Ningbo (CN); Yao Chen, Beijing (CN); Qing Yuan Meng, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 297 days.

(21) Appl. No.: 17/823,136

(22) Filed: Aug. 30, 2022

(65) Prior Publication Data

US 2024/0069975 A1 Feb. 29, 2024

(51) Int. Cl.
*G06F 9/50* (2006.01)
(52) U.S. Cl.
CPC ............ *G06F 9/505* (2013.01); *G06F 9/5016* (2013.01); *G06F 9/5077* (2013.01)
(58) Field of Classification Search
CPC ...... G06F 9/505; G06F 9/5016; G06F 9/5077; G06F 9/5005; G06F 2209/501; G06F 9/4806; G06F 16/245; G06F 9/466; G06F 2209/485
See application file for complete search history.

(56) References Cited

U.S. PATENT DOCUMENTS

| 2012/0226799 A1 | 9/2012 | Kapur et al. | |
| 2013/0185433 A1* | 7/2013 | Zhu ........................ | G06F 9/5011 |
| | | | 709/226 |
| 2019/0317824 A1* | 10/2019 | Mani ..................... | G06F 9/5077 |

(Continued)

FOREIGN PATENT DOCUMENTS

| CN | 110855578 A | 2/2020 |
| CN | 114443284 A | 5/2022 |

OTHER PUBLICATIONS

Jindal, Anshul, "Performance Model Derivation for Cloud-Based Microservices Applications", published Oct. 11, 2018, University of Munich at: https://mediatum.ub.tum.de/doc/1456276/1456276.pdf, 53 pages (Year: 2018).

(Continued)

*Primary Examiner* — Jorge A Chu Joy-Davila
(74) *Attorney, Agent, or Firm* — Aaron Pontikos, Esq; Kevin P. Radigan, Esq.; Heslin Rothenberg Farley & Mesiti P.C.

(57) ABSTRACT

Resource optimized forwarding of classified requests to different instances of a microservice is provided. The process includes obtaining classified requests to a microservice. The classified requests are classified based on different microservice resource consumption types. Further, the method includes forwarding the classified requests to instances of the microservice with different assigned resource configurations. The forwarding is based on the different microservice resource consumption types of the classified requests.

17 Claims, 8 Drawing Sheets

(56) References Cited

U.S. PATENT DOCUMENTS

2023/0289358 A1 *  9/2023  Jones ................. G06F 16/2462
2023/0342200 A1 *  10/2023  Tummala ............. G06F 9/5016

OTHER PUBLICATIONS

Khaleq, Abeer Abdel et al., "Agnostic Approach for Microservices Autoscaling in Cloud Applications", 2019 International Conference on Computational Science and Computational Intelligence (CSCI), published Dec. 2019 at: https://ieeexplore.ieee.org/abstract/document/9070951, pp. 1411-1415 (Year: 2019).

Mel et al., "The NIST Definition of Cloud Computing," National Institute of Standards and Technology, Information Technology Laboratory, Special Publication 800-145, Sep. 2011 (pp. 1-7) (Year: 2011).

Yu, Yinbo et al., "Joint Optimization of Service Request Routing and Instance Placement in the Microservice System" published Sep. 9, 2019 in Research Gate at: https://www.researchgate.net/profile/Yu-Yinbo/publication/335792035 . . . , 16 pages (Year: 2019).

\* cited by examiner

100

200

RESOURCE OPTIMIZED LOAD BALANCING OF MICROSERVICE REQUESTS

BACKGROUND

One or more aspects relate, in general, to processing within a computing environment, and in particular, to improving load balancing within a microservice architecture-based computing environment.

A microservice architecture provides services that are independently deployable. In such an architecture, services or microservices are fine-grained, and associated protocols are typically lightweight. This makes a microservice application easy to understand, develop, test, etc. Microservices can be implemented using different programming languages, databases, hardware and software environments. In one or more embodiments, microservices are small in size, messaging-enabled, bounded by contracts, autonomously developed, independently deployable, decentralized, and often built and released with automated processes. In a microservice architecture, the software can embody small independent services that communicate over defined application programming interfaces (APIs). In one or more implementations, a service or microservice runs its own process. A microservice is not a layer within a monolithic application, but rather, is a self-contained operation or function with clear interfaces, and may have its own internal components and implement a layered architecture. A microservice architecture is commonly adopted for cloud-native applications, and applications using lightweight container deployment.

In a microservice architecture-based implementation, a service is typically deployed as multiple instances to facilitate concurrently handling multiple requests.

SUMMARY

Certain shortcomings of the prior art are overcome, and additional advantages are provided herein through the provision of a computer program product for facilitating processing within a computing environment. The computer program product includes one or more computer readable storage media and program instructions embodied therewith. The program instructions are readable by a processing circuit to cause the processing circuit to perform a method, which includes obtaining classified requests to a microservice, the classified requests being classified based on different microservice resource consumption types. Further, the method includes forwarding the classified requests to instances of the microservice with different assigned resource configurations, where the forwarding is based on the different microservice resource consumption types of the classified requests.

Computer-implemented methods and computer systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

The accompanying figures, which are incorporated in and form a part of this specification, further illustrate the present invention and, together with this detailed description of the invention, serve to explain aspects of the present invention. Note in this regard that descriptions of well-known systems, devices, processing techniques, etc., are omitted so as to not unnecessarily obscure the invention in detail. It should be understood, however, that the detailed description and this specific example(s), while indicating aspects of the invention, are given by way of illustration only, and not limitation. Various substitutions, modifications, additions, and/or other arrangements, within the spirit or scope of the underlying inventive concepts will be apparent to those skilled in the art from this disclosure. Note further that numerous inventive aspects or features are disclosed herein, and unless inconsistent, each disclosed aspect or feature is combinable with any other disclosed aspect or feature as desired for a particular application of the concepts disclosed.

Note also that illustrative embodiments are described below using specific code, designs, architectures, protocols, layouts, schematics, or tools only as examples, and not by way of limitation. Furthermore, the illustrative embodiments are described in certain instances using particular software, tools, or data processing environments only as example for clarity of description. The illustrative embodiments can be used in conjunction with other comparable or similarly purposed structures, systems, applications, or architectures.

One or more aspects of an illustrative embodiment can be implemented in hardware, software, or a combination thereof.

Figure 1:
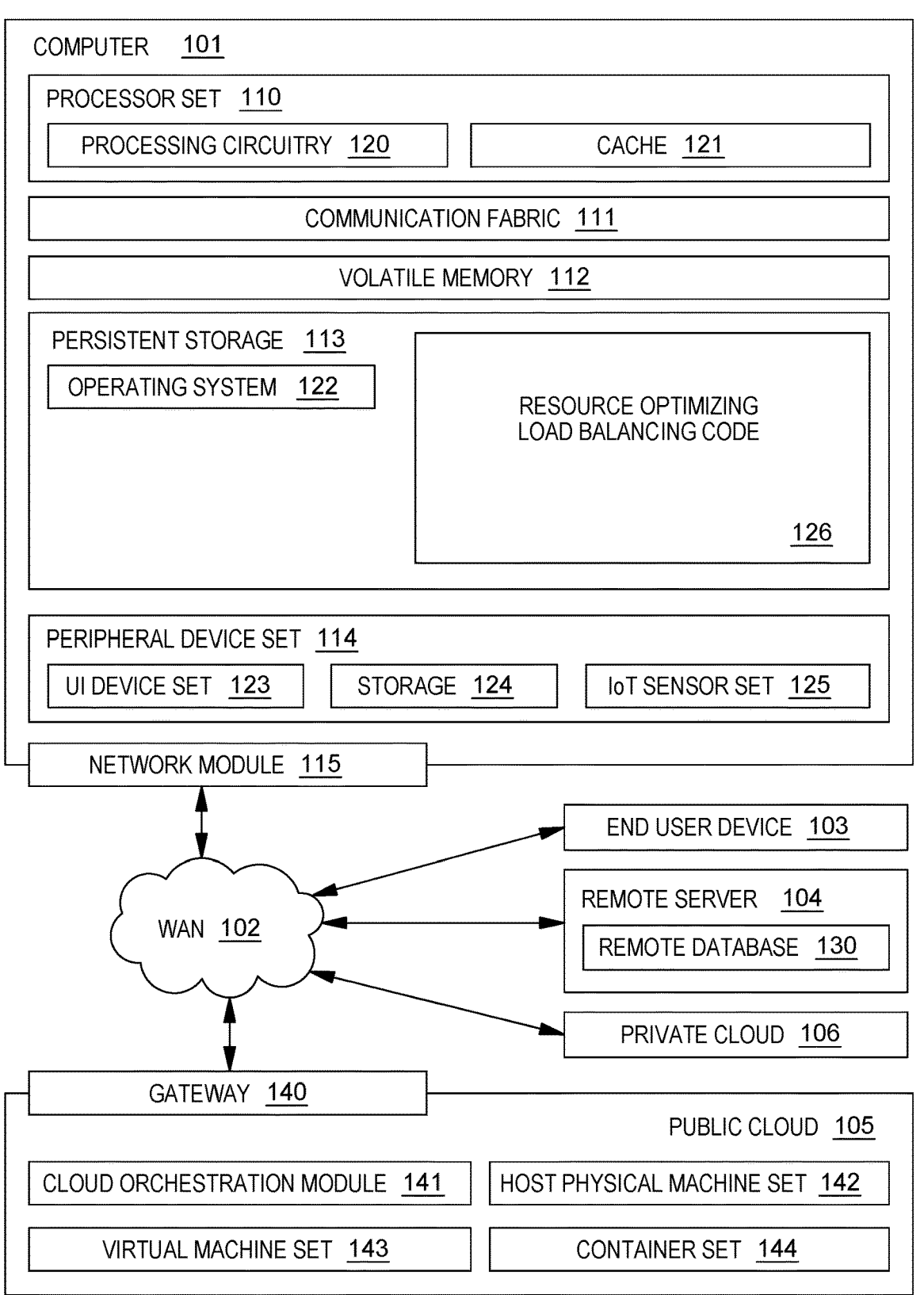
FIG. 1 depicts one example of a computing environment to include and/or use one or more aspects of the present invention.

As understood by one skilled in the art, program code, as referred to in this application, can include software and/or hardware. For example, program code in certain embodiments of the present invention can utilize a software-based implementation of the functions described, while other embodiments can include fixed function hardware. Certain embodiments combine both types of program code. Examples of program code, also referred to as one or more programs, are depicted in FIG. 1 as operating system 122 and resource optimizing load balancing code 126, which are stored in persistent storage 113, as well as gateway 140, cloud orchestration module 141, virtual machine set 143, and container set 144, which are part of, or associated with, public cloud 105, in the example computing environment 100 of FIG. 1. In another example, program code depicted in the computing environment of FIG. 7 includes, in part, application program(s) 716, operating system 718, performance analyzer 720, resource optimized load balancer 721, and computer-readable program instruction(s) 722, which are stored in memory 706 of computer system 702.

Containerization is the packaging of software code, for instance to implement a service or microservice, with its dependencies, such as operating system libraries and/or other dependencies, used to run the software code to create a single, lightweight executable, referred to as a container. The container is portable in that it runs consistently and reliably on any information technology infrastructure. In one or more embodiments, the software code can be an application, such as a service instance, or microservice instance. A container is created from a container image, which is a static file that includes executable program code that can be run as an isolated process on a computing or information technology (IT) infrastructure. One image can be used to run one or more containers, which are runtime instances of the container image. Containers are lightweight (e.g., they share the machine's operating system), efficient, easy to manage, secure, and portable.

One example of a product used to provide and manage containers is Kubernetes®, which is an open-source system for automating deployment, scaling and management of containerized applications. (Kubernetes® is a Registered Trademark of the Linux Foundation in at least one jurisdiction.) Kubernetes groups containers that make up an application into logical units for easy management and discovery. In operation, Kubernetes orchestrates a containerized application to run on a cluster of hosts (or nodes), and automates deployment and management of cloud-native applications using on-premise infrastructure or public cloud platforms. The Kubernetes system is designed to run containerized applications across a cluster of nodes (or servers or devices), which can be at a single geographic location or distributed across multiple geographic locations. In one or more implementations, a cluster is a set of nodes (whether physical computing resources or virtual computing resources) running Kubernetes agents, managed by the Kubernetes control plane.

Container orchestration is the automation of much of the operational effort required to run containerized workloads and services. Orchestration includes a wide range of processes required to maintain a container's lifecycle, including provisioning, deployment, scaling (up and down), networking, load-balancing, and more. Note that Kubernetes is one example only of a orchestration platform that can be used to manage, for instance, microservice instances, such as referenced herein. In one or more embodiments, other platforms, such as Docker™, can be used to facilitate managing microservice instances, in accordance with one or more aspects disclosed. (Docker™ is a Trademark or Registered Trademark of Docker, Inc., of San Francisco, California, USA.)

Prior to describing embodiments of the present invention, an example of a computing environment to include and/or use one or more aspects of the present invention is discussed below with reference to FIG. 1.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive-related methods, including resource optimizing load balancing code 126. In addition to block 126, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 126, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/ or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 126 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like.

Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 126 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

As noted, in a microservice architecture-based implementation, a service can be deployed as multiple instances to facilitate concurrently handling multiple requests. In one or more embodiments, the multiple requests can include multiple different request types, such as search a list of records, create a new record, etc. A load balancer can be positioned in front of the multiple microservice instances to forward incoming requests to the instances, conventionally in a round-robin manner.

Figure 2:
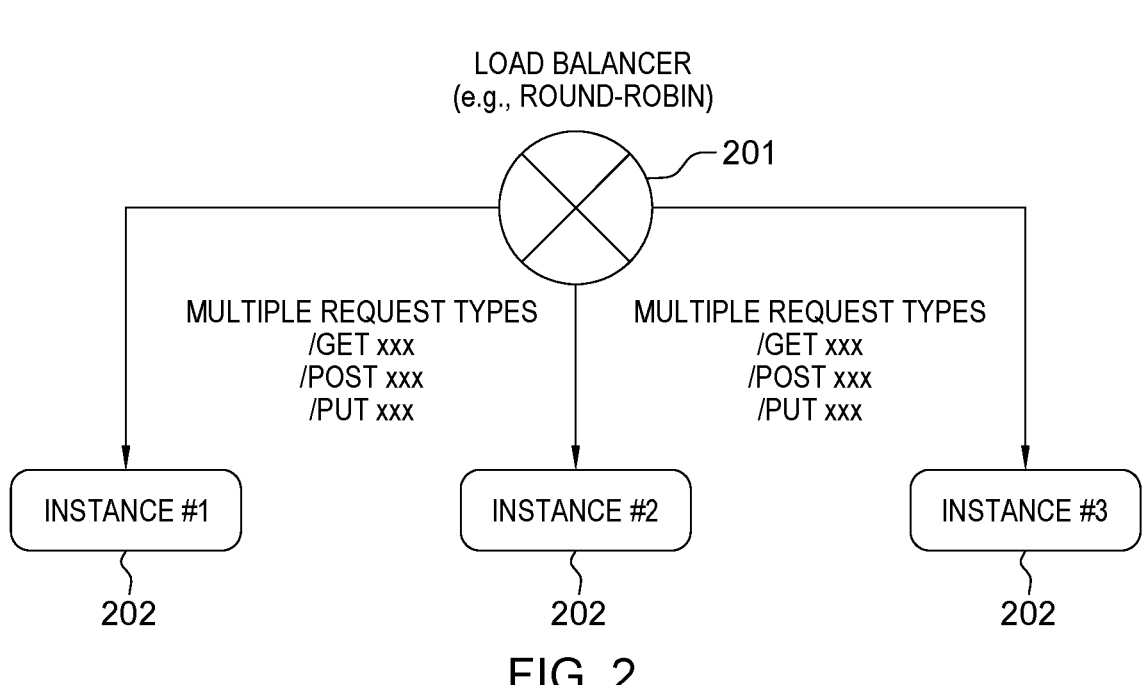
FIG. 2 depicts one embodiment of a computing environment with a load balancer forwarding different requests to multiple instances of a microservice, which can be enhanced in accordance with one or more aspects of the present invention.

An example embodiment is depicted in FIG. 2, where computing environment 200, implemented, for instance, as part of computing environment 100 of FIG. 1, can include load balancing code, or load balancer 201, for directing multiple different types of requests (e.g., /GETxxx, /POSTxxx, /PUTxxx, etc.) to multiple instances of a microservice 202. As noted, load balancer 201 typically forwards the requests in a round-robin manner, which can facilitate implementation. All instances of the microservice are conventionally configured with sufficient resources, such as CPU and memory resources, to handle any request type to be received. The request can be received from one or more clients or tenants consuming a shared set of one or more microservices. A disadvantage of the FIG. 2 round-robin approach, however, is that there is necessarily a certain amount of assigned resource waste at the microservice instances. For instance, certain request types can require higher amounts of CPU resources, but lower memory resources, while other request types can require higher memory resources, but lower CPU resources. Conventionally, all instances are configured with both the highest amount of CPU resources required for the anticipated request types, and the highest amount of memory resources required, to ensure that all types of requests can be efficiently handled by any of the microservice instances. This often results in the resources being oversized for the service being performed.

Embodiments of the present invention include computer program products, computer-implemented methods, and computer systems, where program code executing on one or more processors facilitates resource optimized forwarding of classified requests to different instances of a microservice. The process includes obtaining classified requests to the microservice. The classified requests are classified based on different microservice resource consumption types. The program code forwards the classified requests to instances of the microservice with different assigned resource configurations. The forwarding is based on the different microservice resource consumption types of the classified requests. In one or more embodiments, a resource optimized load balancer, such as discussed herein, can implement the obtaining of the classified requests and the forwarding of the classified requests. In addition to the load balancing strategy for different classified requests, approaches are provided herein for classifying requests based on the resource consumption of the different resources in a microservice-based architecture. Further, a mechanism is provided to dynamically invalidate or re-classify a classified request via its resource consumption tendency at runtime. Advantageously, the concepts disclosed herein improve a computing environment's overall response time, as classified requests are forwarded to a microservice instance which has the most suitable resource configuration for the particular classified request. Further, multiple instances of the same service can be configured with different resource sizes to handle certain classes or kinds of requests, thereby improving overall resource utilization.

Figure 3:
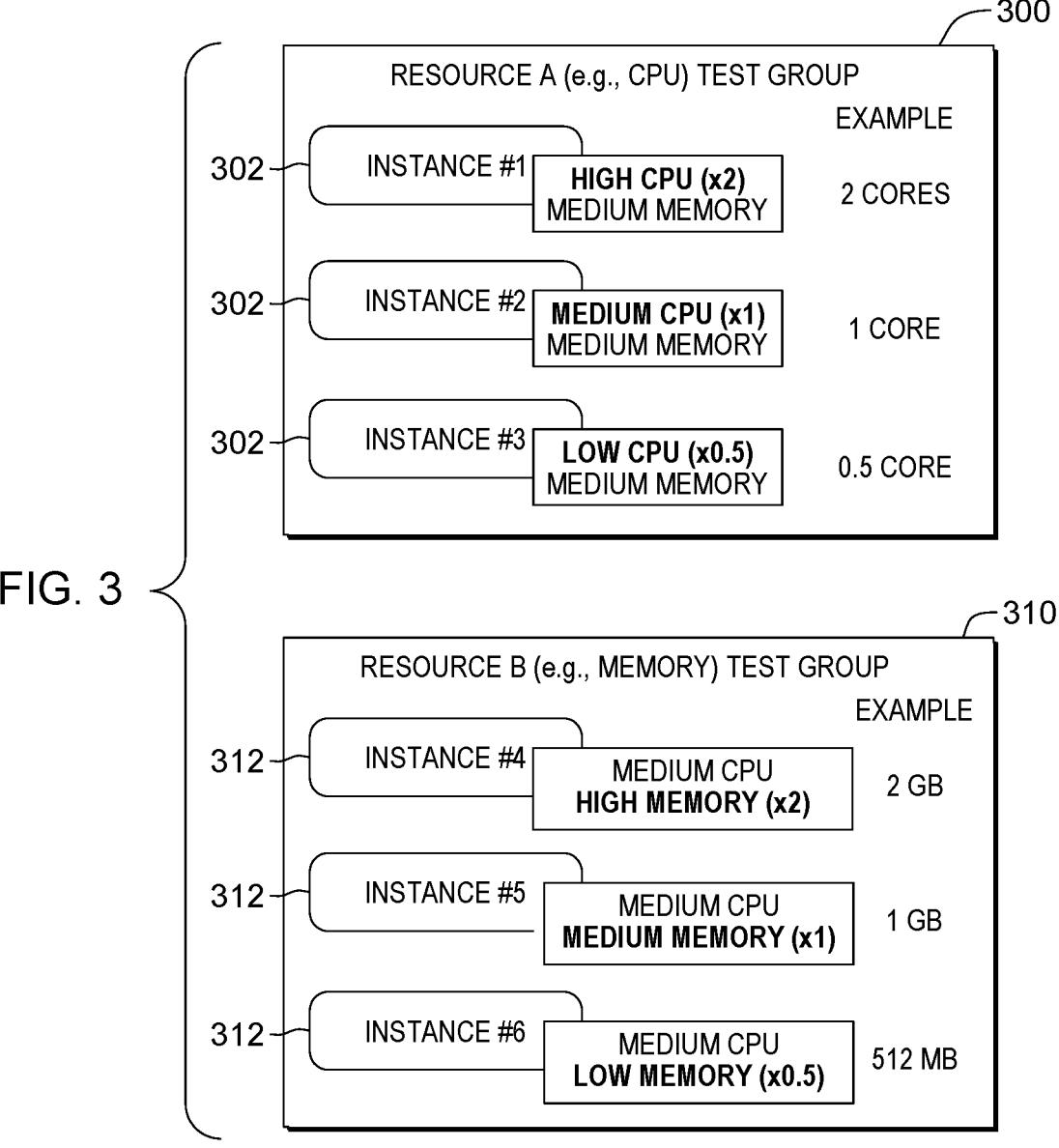
FIG. 3 depicts a computing environment with multiple groups of instances of a microservice, each with a different assigned resource configuration, in accordance with one or more aspects of the present invention.

FIG. 3 depicts one embodiment of different kinds of resource test groups, which can be used to facilitate classifying different requests to a microservice based on the requests' resource consumptions. Once classified, a classified request can be forwarded by the load balancer to a corresponding service instance configured with an optimal resource configuration for that request. Note that the classifying concepts disclosed herein can be used in association with one or more microservice resources. Where two or more resources are being considered, the classifying can occur in parallel, or sequentially, depending on the implementation. In the embodiments of FIGS. 3-6 described below, two microservice resources are used in evaluating a request to classify the request based on the different microservice resource consumption types. This represents one example only, and as noted, the concepts described herein can be applied to classifying requests based on a single microservice resource, or classifying requests based on three or more microservice resources.

By way of example only, microservice instance resource A is, for instance, a CPU resource, and microservice instance resource B is (in one example) a memory resource. As shown in FIG. 3, in resource A test group 300, three microservice instances 302 are considered (by way of example) each with a different assigned resource configuration, such as a 0.5 CPU core, a 1 CPU core, and 2 CPU cores. Note that other resource sizes can be used for request classification, depending on the implementation. Further, in resource A test group 300, other associated microservice resources, such as memory in this example, are maintained constant at an anticipated or specified memory level, such as a medium memory level. Similarly, resource B test group 310 has microservice instances 312 with a fixed, medium CPU configuration and different memory configurations. By way of example only, instance #4 is shown to have a high memory configuration (such as 2 GB), instance #5 has a medium memory configuration (such as 1 GB), and instance #6 has a low memory configuration (such as ½ GB, or 512 MB). The goal of creating the different microservice resource configuration test groups is to determine which resource configuration supports which microservice resource consumption type most effectively.

Figure 4A:
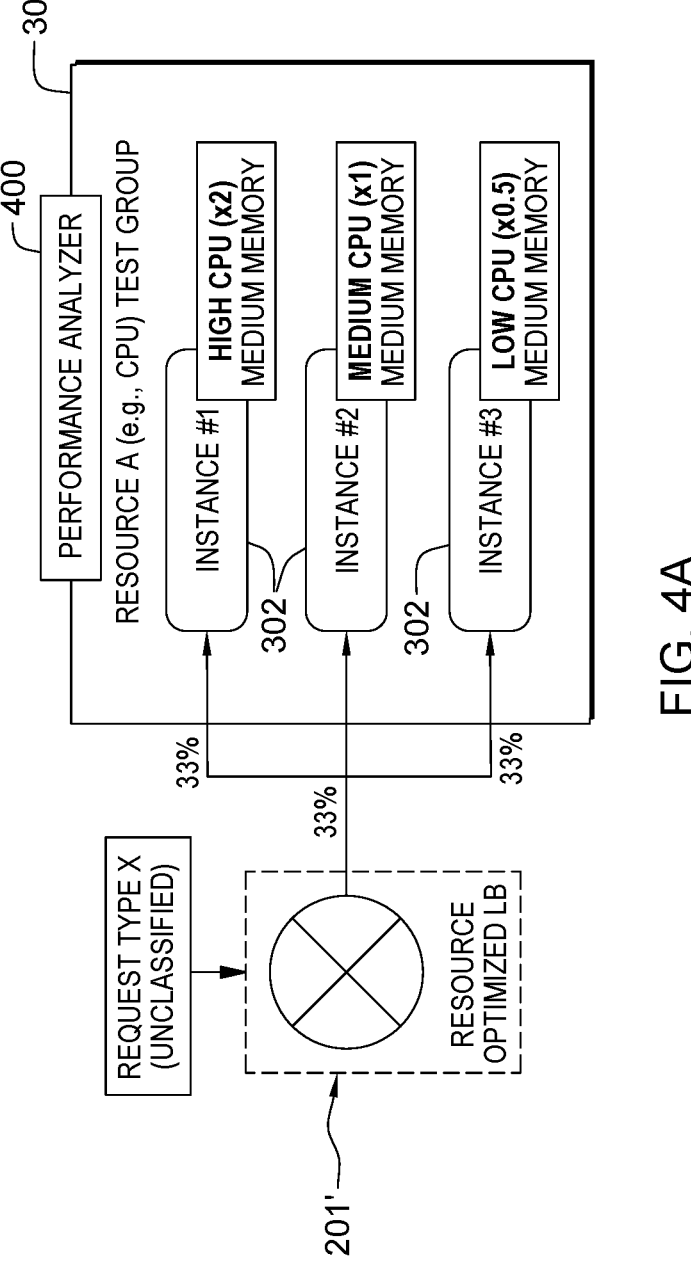
FIG. 4A depicts forwarding of multiple unclassified requests of type x to multiple instances of a microservice with different resource A (e.g., CPU) configurations, in accordance with one or more aspects of the present invention.
Figure 4B:
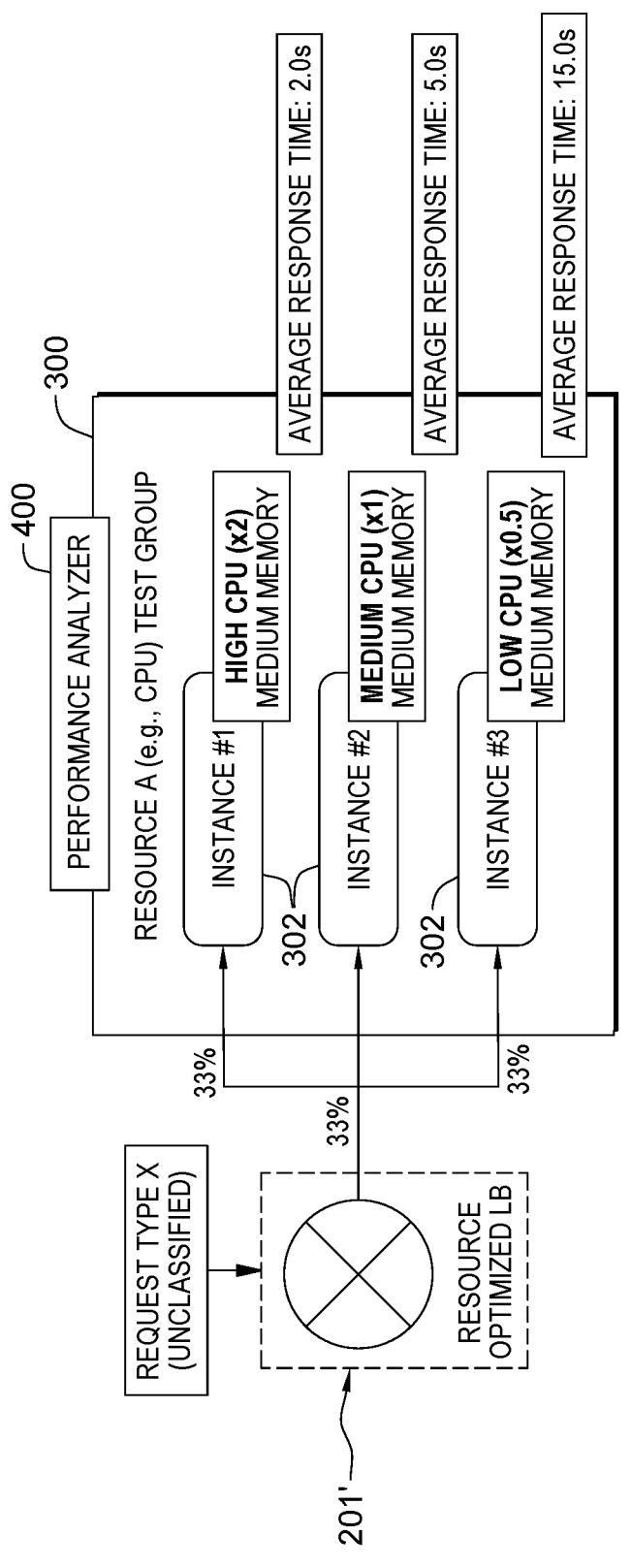
FIG. 4B depicts the computing environment of FIG. 4A, with average response times determined for the unclassified requests of type x processed by the microservice, in accordance with one or more aspects of the present invention.

As illustrated in FIG. 4A, a load balancer, or resource optimized load balancer 201', facilitates implementing one or more aspects described herein. Load balancer 201' receives unclassified requests of a particular type, such as type x, and forwards the unclassified requests to the instances in one or more resource test groups. In one or more embodiments, the unclassified requests of request type x can be forwarded equally to the different microservice instances 302 in the one or more resource test groups, such as resource A test group 300. Note that resource A test group 300 is shown in FIG. 4A, by way of example only. A performance analyzer 400 is also provided to facilitate recording response times for each request x being handled by the different microservice instances 302. Based on the total count of unclassified requests x reaching a specified number, for instance, each instance has processed unclassified requests x 10 times, 100 times, etc., then performance analyzer 400 determines, in one embodiment, the average response time for each microservice instance 302 resource configuration, as shown in FIG. 4B. By way of example only, the average response time with the lower configured CPU resource might be 15 seconds, the medium CPU configured resource might be 5 seconds, and the average response time with the high CPU configured resource might be 2 seconds. If there are one or more additional resource test groups, such as resource B test group 310 illustrated in FIG. 3, then the process is repeated, with resource consumption of each request type being separately evaluated.

By way of further example, the largest average response time difference can be determined for each resource test group. For instance, a resource A test group time difference can be determined as the highest average time minus the lowest average time in resource A test group (e.g., the CPU test group). Further, the largest resource B test group time difference can be determined similarly as the highest average time of the resource B test group minus the lowest average time. If the resource A test group time difference is greater than a specified threshold, for instance, 2 seconds, and the resource B test group time difference is less than a specified threshold, then it is determined that the request type x is more resource A sensitive (e.g., CPU sensitive). In that case, request x is classified as resource A-intensive request (e.g., CPU-intensive request). Similarly, other request types can be classified into other class types, including for instance: resource B-intensive requests, both resource A and resource B intensive requests, or normal resource A and resource B requests. In one example only, resource A is CPU resources, and resource B is memory resources, which are assigned to the different microservice instances. As noted, the assigned resource configurations of FIGS. 3-4B are presented by way of example only. In one or more other implementations, a single microservice resource can be evaluated, with classifying being based on the results of that evaluation. Alternatively, more than 2 resources can be evaluated. For instance, in the case of three resources, 8 different request classes can be evaluated based on the different microservice resource consumptions of the requests.

Note that as part of, for instance, resource optimized load balancer 201', a resource allocator module can be provided responsible for allocating the different resource configurations to the different instances or pods of a service (i.e., microservice) to handle the various request types. Further, a resource consumption classifier module can be provided to facilitate classifying requests into the different classes of microservice resource consumption types. In one embodiment, the resource allocator module and/or resource consumption classifier module can be part of, or associated with, a resource optimized load balancer, such as disclosed therein. In one or more implementations, the resource allocator module allocates resources for the instances, with the instances being divided into different test or compare groups, depending on the number of resources to be considered. In addition, the number of microservice instances within a given test group can vary, depending upon the level of classification desired. The three instances with different resource configurations in a test group, such as resource A test group 300 or resource B test group 310 of FIG. 3, are provided by way of example only. Each resource test group has different configurations of a particular resource, with the other resources being fixed across the instances in that test group. The resource consumption classification module can assist with classifying of unclassified requests to the microservice to obtain classified requests, as well as the handling of the classified requests. The classifying can occur as described above in connection with FIG. 4B, and the handling of the classified requests can be as depicted in FIG. 5.

Figure 5:
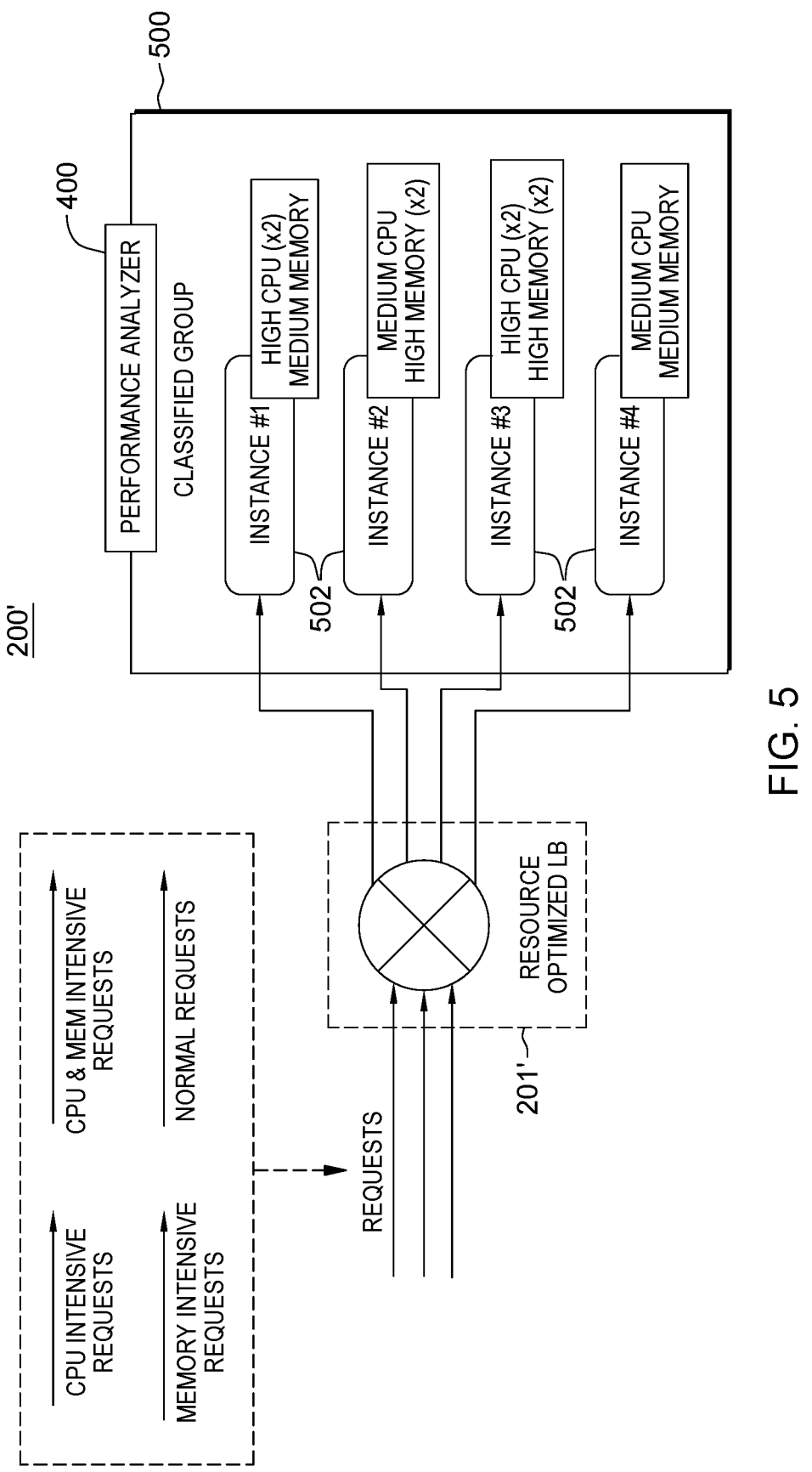
FIG. 5 depicts one embodiment of a computing environment where already classified requests are directed by a resource optimized load balancer to microservice instances with different assigned resource configurations, in accordance with one or more aspects of the present invention.

As illustrated in computing environment 200' of FIG. 5, requests received at resource optimized load balancer 201' can be forwarded based on classification to the corresponding microservice instance 502 for handling. In the example depicted, the classified requests are received at the resource optimized load balancer 201' include CPU-intensive requests, CPU and memory-intensive requests, memory-intensive request, and normal CPU and memory requests. Further, as illustrated, a classified group 500 of instances 502 of a microservice is provided, with each instance being assigned having a different resource configuration. By way of example, instance #1 can have assigned resources of medium memory capacity and high CPU capacity, instance #2 can have high memory capacity and medium CPU capacity, instance #3 can have high memory capacity and high CPU capacity, and instance #4 can have medium CPU capacity and medium memory capacity. As noted, the quantifications described herein are provided by way of example only. Note further that classified group 500 of FIG. 5 within computing environment 200' can continue to be monitored at runtime by performance analyzer 400.

Figure 6:
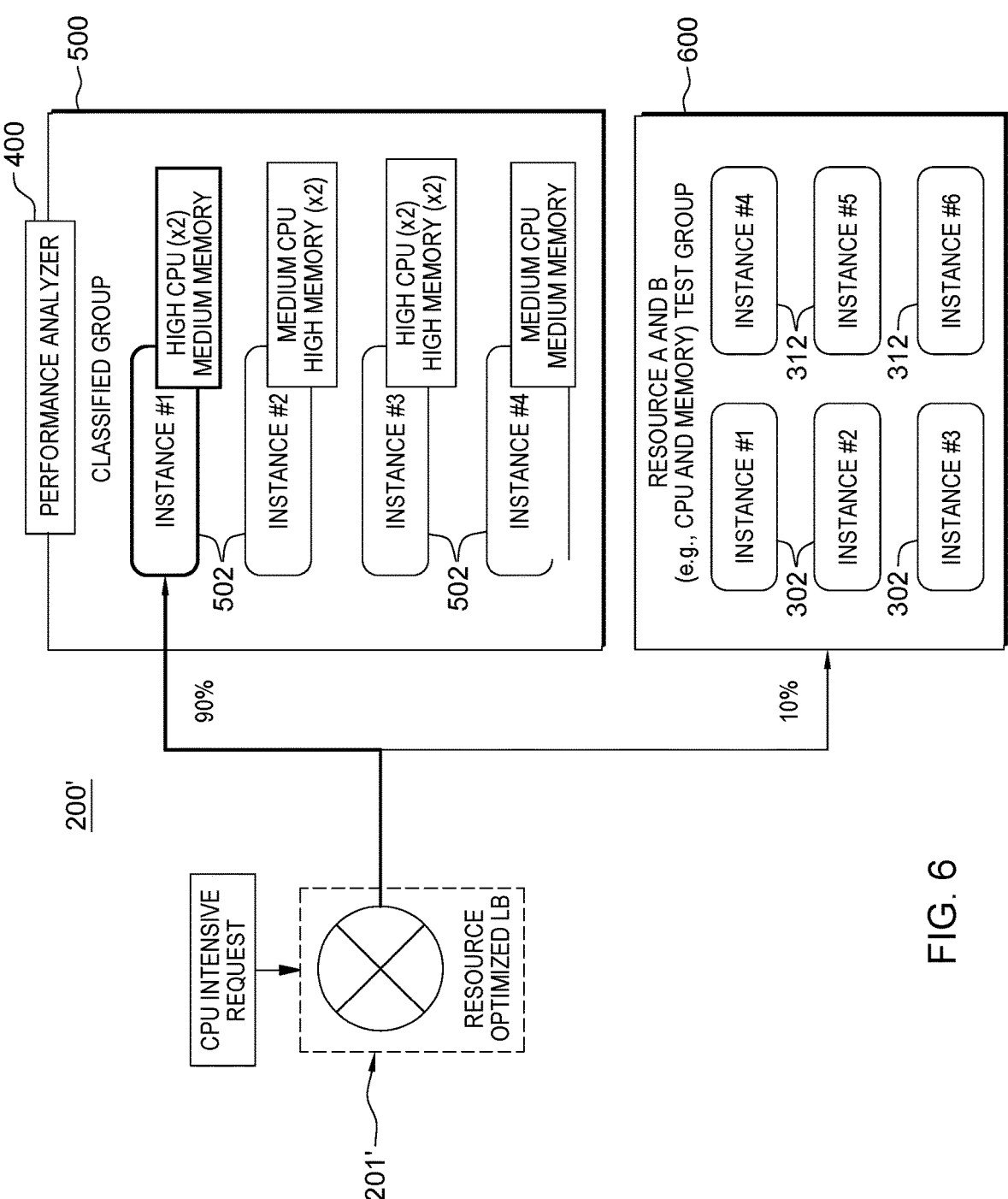
FIG. 6 depicts the computing environment embodiment of FIG. 5, with runtime reevaluation of a classified request based on response times varying by a specified threshold, in accordance with one or more aspects of the present invention.

As illustrated in FIG. 6, a classified request, such as a CPU-intensive request, is forwarded by resource optimized load balancer 201' to the corresponding microservice instance 502 with the high-CPU-configured resource within classified group 500. In one or more embodiments, performance analyzer 400 can continuously monitor response times of the particular requests (e.g., CPU-intensive requests). If response time is slower than an anticipated value by a certain specified percentage, such as a 5% threshold, then a percentage of the CPU-intensive requests can be forwarded to a resource A & resource B test group 600, which in one embodiment, can be a combination of test or compare groups 300 & 310 of FIG. 3. In this way, test group 600 and performance analyzer 400 can again revaluate, and possibly facilitate reclassifying, the request type by repeating the processing described above to confirm, for instance, that the request type is still properly classified, and/or to reclassify the request type if appropriate. Reclassification can be appropriate where the request type may have been modified to no longer benefit from a particular microservice resource configuration.

Another embodiment of a computing environment to incorporate and use one or more aspects of the present invention is described with reference to FIG. 7. As examples, the computing environment may be of various architectures and of various types, including, but not limited to: personal computing, client-server, distributed, virtual, emulated, partitioned, non-partitioned, cloud-based, grid, time-sharing, cluster, peer-to-peer, mobile, having one node or multiple nodes, having one processor or multiple processors, and/or any other type of environment and/or configuration, etc. that is capable of executing a process that, e.g., stores data such as described herein and retrieves and uses that data to provide resource optimized load balancing among microservice instances. Aspects of the present invention are not limited to a particular architecture or environment.

Figure 7:
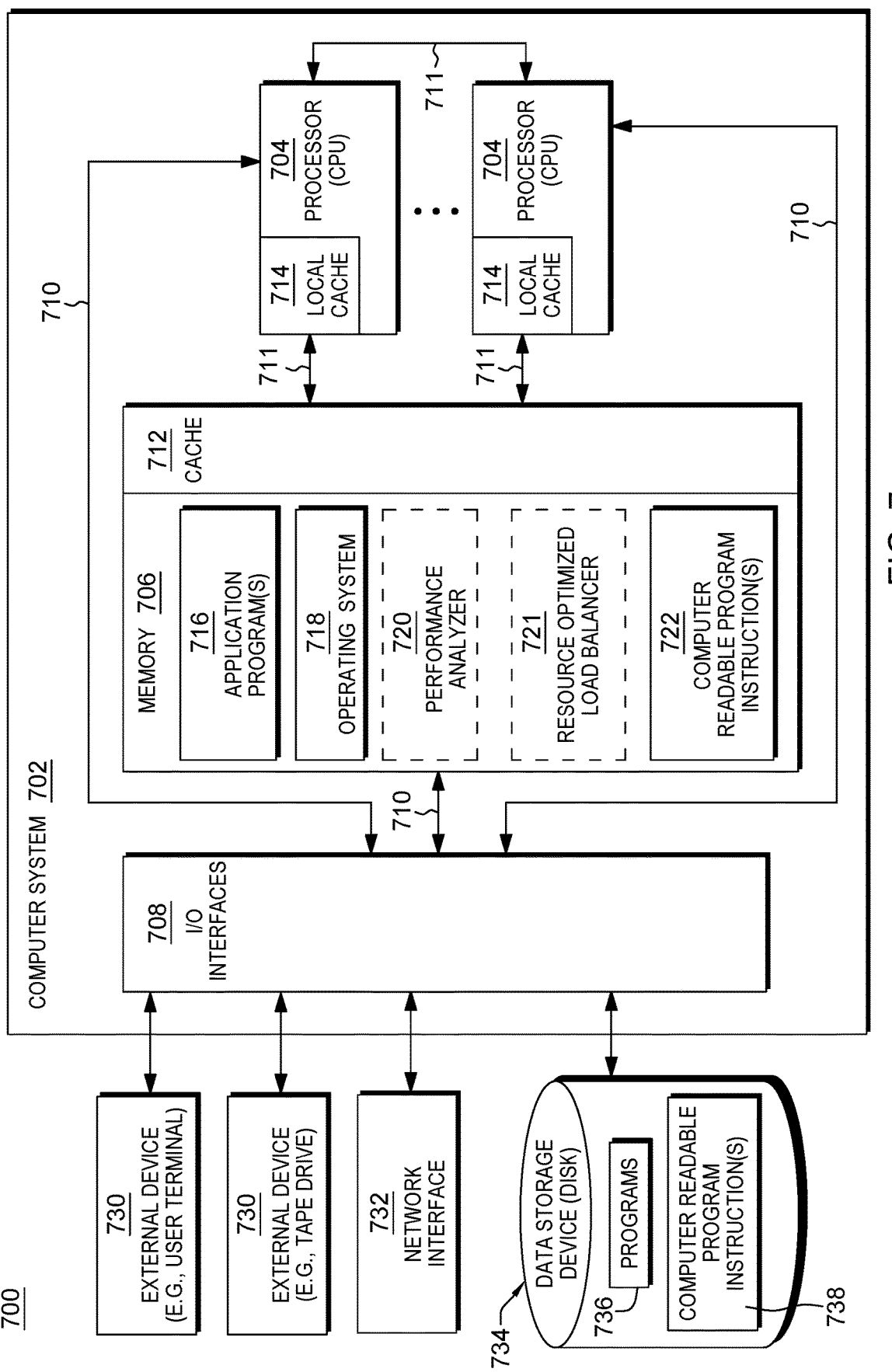
FIG. 7 depicts another example of a computing environment to include and/or use one or more aspects of the present invention.

Referring to FIG. 7, in one example, a computing environment 700 includes, for instance, a computer system 702 shown, e.g., in the form of a general-purpose computing device. Computer system 702 may include, but is not limited to, one or more processors or processing units 704 (e.g., central processing units (CPUs) and/or special-purpose processors, etc.), a memory 706 (a.k.a., system memory, main memory, main storage, central storage or storage, as examples), and one or more input/output (I/O) interfaces 708, coupled to one another via one or more buses and/or other connections. For instance, processors 704 and memory 706 are coupled to I/O interfaces 708 via one or more buses 710, and processors 704 are coupled to one another via one or more buses 711.

Bus 711 is, for instance, a memory or cache coherence bus, and bus 710 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 706 may include, for instance, a cache 112, such as a shared cache, which may be coupled to local caches 714 of one or more processors 704 via, e.g., one or more buses 711. Further, memory 706 may include one or more programs or applications 716, at least one operating system 718, and one or more of a performance analyzer 720 and a resource optimized load balancer 721, which are used in accordance with one or more aspects of the present invention, as well as one or more computer readable program instructions 722. Computer readable program instructions 722 may be configured to carry out one or more functions of embodiments of the invention.

Computer system 702 may communicate via, e.g., I/O interfaces 708 with one or more external devices 730, such as a user terminal, a tape drive, a pointing device, a display, and one or more data storage devices 734, etc. A data storage device 734 may store one or more programs 736, one or more computer readable program instructions 738, and/or data, etc. The computer readable program instructions may be configured to carry out functions of embodiments of aspects of the invention.

Computer system 702 may also communicate via, e.g., I/O interfaces 708 with network interface 732, which enables computer system 702 to communicate with one or more networks, such as a local area network (LAN), a general wide area network (WAN), and/or a public network (e.g., the Internet), providing communication with other computing devices or systems.

Computer system 702 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 702. Examples, include, but are not limited to: microcode, device drivers, redundant processing units, external disk drive arrays, RAID systems, tape drives, and data archival storage systems, etc.

Computer system 702 may be operational with numerous other general-purpose or special purpose computing system environments or configurations. Examples of well-known computing systems, environments, and/or configurations that may be suitable for use with computer system 702 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computing environments described herein are only examples of computing environments that can be used. Other environments, including but not limited to, non-partitioned environments, partitioned environments, cloud environments, distributed environments, non-distributed environments, virtual environments and/or emulated environments, may be used; embodiments are not limited to any one environment. Although various examples of computing environments are described herein, one or more aspects of the present invention may be used with many types of environments. The computing environments provided herein are only examples.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspect, an application may be deployed for performing one or more embodiments. As one example, the deploying of an application comprises providing computer infrastructure operable to perform one or more aspects of one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, additional, fewer and/or other features, constraints, tasks and/or events may be considered. Many variations are possible.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a computing environment, the computer program product comprising:

one or more computer-readable storage media and program instructions embodied therewith, the program instructions being readable by a processing circuit to cause the processing circuit to perform a method comprising:

classifying one or more unclassified request types to a microservice of the computing environment, the classifying comprising for a particular request type:
sending multiple digital requests of the particular request type to a group of instances of the micro- service with different resource configurations, and monitoring digital response times thereof; and
based on the monitored digital response times, classifying the particular request type into one of multiple request classes of different microservice resource consumption types;
obtaining classified requests to the microservice, the classified requests being classified based on different microservice resource consumption types; and
forwarding the classified requests to instances of the microservice with different assigned resource configurations, the forwarding being based on the different microservice resource consumption types of the classified requests to enhance the computing environment's overall response time.

2. The computer program product of claim 1, wherein the instances of the microservice with different assigned resource configurations comprise instances of the microservice with different quantities of an assigned resource.

3. The computer program product of claim 1, wherein the instances of the microservice with different assigned resource configurations comprise instances of the microservice with multiple types of assigned resources with different quantities of assigned resources.

4. The computer program product of claim 1, wherein the classifying further comprises determining a microservice resource of the different resource configurations with which the particular request type is most performance-sensitive, and classifying the particular request type based, at least in part, thereon.

5. The computer program product of claim 1, wherein the classifying further comprises obtaining for each of the instances of the microservice, an average response time for the particular request type, and using the average response times, classifying the particular request into the one of the multiple request classes of different microservice resource consumption types.

6. The computer program product of claim 1, wherein the different resource configurations of the instances of the microservice comprise multiple resource types, the multiple resource types including CPU resources and memory resources.

7. The computer program product of claim 6, wherein for a particular resource type of the multiple resource types, different ones of the instances of the microservice have different respective resource configurations.

8. The computer program product of claim 1, further comprising monitoring response times of the classified requests forwarded to the instances of the microservice, and based on one or more monitored response times being below a specified threshold, reevaluating, at least in part, the classifying of the particular request type into the one of the multiple request classes of different microservice resource consumption types.

9. A computer-implemented method comprising:
classifying one or more unclassified request types to a microservice of the computing environment, the classifying comprising for a particular request type:
sending multiple digital requests of the particular request type to a group of instances of the microservice with different resource configurations, and monitoring digital response times thereof; and based on the monitored digital response times, classifying the particular request type into one of multiple request classes of different microservice resource consumption types;
obtaining classified requests to the microservice, the classified requests being classified based on different microservice resource consumption types; and
forwarding the classified requests to instances of the microservice with different assigned resource configurations, the forwarding being based on the different microservice resource consumption types of the classified requests to enhance the computing environment's overall response time.

10. The computer-implemented method of claim 9, wherein the instances of the microservice with different assigned resource configurations comprise instances of the microservice with different quantities of an assigned resource.

11. The computer-implemented method of claim 10, wherein the instances of the microservice with different assigned resource configurations comprise instances of the microservice with multiple types of assigned resources with different quantities of assigned resources.

12. The computer-implemented method of claim 9, wherein the classifying further comprises determining a microservice resource of the different resource configurations with which the particular request type is most performance-sensitive, and classifying the particular request type based, at least in part, thereon.

13. The computer-implemented method of claim 9, wherein the classifying further comprises obtaining for each of the instances of the microservice, an average response time for the particular request type, and using the average response times, classifying the particular request into the one of the multiple request classes of different microservice resource consumption types.

14. The computer-implemented method of claim 9, further comprising monitoring response times of the classified requests forwarded to the instances of the microservice, and based on one or more monitored response times being below a specified threshold, reevaluating, at least in part, the classifying of the particular request type into the one of the multiple request classes of different microservice resource consumption types.

15. A computer system for facilitating processing within a computing environment, the computer system comprising:
a memory; and
at least one processor in communication with the memory, wherein the computer system is configured to perform a method, the method comprising:
classifying one or more unclassified request types to a microservice of the computing environment, the classifying comprising for a particular request type:
sending multiple digital requests of the particular request type to a group of instances of the microservice with different resource configurations, and monitoring digital response times thereof; and
based on the monitored digital response times, classifying the particular request type into one of multiple request classes of different microservice resource consumption types;
obtaining classified requests to the microservice, the classified requests being classified based on different microservice resource consumption types; and
forwarding the classified requests to instances of the microservice with different assigned resource configurations, the forwarding being based on the different microservice resource consumption types of the classified requests to enhance the computing environment's overall response time.

16. The computer system of claim 15, wherein the instances of the microservice with different assigned resource configurations comprise instances of the microservice with different quantities of an assigned resource.

17. The computer system of claim 15, wherein the instances of the microservice with different assigned resource configurations comprise instances of the microservice with multiple types of assigned resources with different quantities of assigned resources.

\* \* \* \* \*